US012719099B2

(12) United States Patent
Bilinski et al.

(10) Patent No.: US 12,719,099 B2
(45) Date of Patent: Aug. 25, 2026

(54) VERSATILE RECHARGEABLE ENERGY STORAGE SYSTEM TRAY COOLING

(71) Applicant: GM GLOBAL TECHNOLOGY OPERATIONS LLC, Detroit, MI (US)

(72) Inventors: Alexander M. Bilinski, Avoca, MI (US); Phillip Daniel Hamelin, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 18/594,951

(22) Filed: Mar. 4, 2024

(65) Prior Publication Data

US 2025/0279495 A1 Sep. 4, 2025

(51) Int. Cl.

| | |
|---|---|
| ***H01M 10/625*** | (2014.01) |
| ***B60K 1/04*** | (2019.01) |
| ***B60L 50/64*** | (2019.01) |
| ***B60L 58/26*** | (2019.01) |
| ***H01M 10/613*** | (2014.01) |
| ***H01M 10/6551*** | (2014.01) |
| ***H01M 10/6561*** | (2014.01) |
| ***H01M 10/6568*** | (2014.01) |
| ***H01M 10/663*** | (2014.01) |

(Continued)

(52) U.S. Cl.

CPC ............. *H01M 10/625* (2015.04); *B60K 1/04* (2013.01); *B60L 50/64* (2019.02); *B60L 58/26* (2019.02); *H01M 10/613* (2015.04); *H01M 10/6551* (2015.04); *H01M 10/6561* (2015.04); *H01M 10/6568* (2015.04); *H01M 10/663* (2015.04); *H01M 50/209* (2021.01); *H01M 50/224* (2021.01); *B60K 2001/005* (2013.01); *B60K 2001/006* (2013.01); *H01M 2220/20* (2013.01)

(58) Field of Classification Search

CPC ............. H01M 10/613; H01M 10/625; H01M 10/6551; H01M 10/66568; B60L 50/64; B60K 2001/0438; B60K 2001/0405; B60K 2001/003; B60K 2001/005; B60K 2001/006

See application file for complete search history.

(56) References Cited

U.S. PATENT DOCUMENTS 10,199,697 B2 * 2/2019 Addanki ............. H01M 10/625
10,471,841 B2 * 11/2019 Choufany ............... F28D 20/02

(Continued)

FOREIGN PATENT DOCUMENTS

EP 3125355 B1 1/2023

OTHER PUBLICATIONS

German Office Action from counterpart DE1020241119101, dated Dec. 5, 2024.

*Primary Examiner* — Jeffrey J Restifo

(57) ABSTRACT

A vehicle includes a vehicle chassis supported by four wheels. At least one electric motor provides drive torque to at least one of the four wheels. A rechargeable energy storage system is supported by the vehicle chassis and provides electricity to the electric motor. The rechargeable energy storage system includes a housing and a plurality of battery cells disposed within the housing. A base of the housing includes an extruded aluminum tray assembly having liquid coolant passages extending through the aluminum tray assembly and air cooling fins extending from a bottom of the extruded aluminum tray assembly.

18 Claims, 4 Drawing Sheets

(51) Int. Cl.

| | |
|---|---|
| ***H01M 50/209*** | (2021.01) |
| ***H01M 50/224*** | (2021.01) |
| *B60K 1/00* | (2006.01) |

(56) References Cited

U.S. PATENT DOCUMENTS

| | | | | |
|---|---|---|---|---|
| 10,611,234 | B1 * | 4/2020 | Berels | H01M 10/656 |
| 12,322,829 | B2 * | 6/2025 | Patel | H01M 10/613 |
| 2015/0194711 | A1 * | 7/2015 | Rawlinson | B60H 1/00278 429/62 |
| 2023/0014338 | A1 * | 1/2023 | Greber | H01M 10/6556 |
| 2024/0006679 | A1 * | 1/2024 | Recouvreur | H01M 10/613 |
| 2024/0322291 | A1 * | 9/2024 | Ogihara | H01M 10/625 |
| 2025/0192263 | A1 * | 6/2025 | Garfinkel | B60L 50/64 |
| 2025/0279495 | A1 * | 9/2025 | Bilinski | H01M 10/625 |
| 2025/0364635 | A1 * | 11/2025 | Salim Shirazy | B60L 1/02 |

* cited by examiner 20
22
22
18
26
22
31
22
28
22
38

VERSATILE RECHARGEABLE ENERGY STORAGE SYSTEM TRAY COOLING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to tray cooling for a rechargeable energy storage system.

SUMMARY

According to an aspect of the present disclosure, a vehicle includes a vehicle chassis supported by four wheels. At least one electric motor provides drive torque to at least one of the four wheels. A rechargeable energy storage system is supported by the vehicle chassis and provides electricity to the electric motor. The rechargeable energy storage system includes a housing and a plurality of battery cells disposed within the housing. A base of the housing includes an extruded aluminum tray assembly having liquid coolant passages extending through the aluminum tray assembly and air cooling fins extending from a bottom of the extruded aluminum tray assembly.

According to a further aspect, a liquid coolant system is connected to the liquid coolant passages in the aluminum tray assembly.

According to a further aspect, the liquid coolant system is connected to an electric motor coolant passage of the at least one electric motor.

According to a further aspect, a coolant connection between the electric motor coolant passage and the liquid coolant passages of the aluminum tray assembly.

According to a further aspect, the air cooling fins extend in a longitudinal direction of the vehicle chassis.

According to a further aspect, the air cooling fins are exposed along a bottom of the vehicle.

According to a further aspect, the liquid coolant system includes battery cell coolant passages disposed between the plurality of battery cells.

According to a further aspect, the extruded aluminum tray assembly includes a plurality of tray sections secured together by welding.

According to a further aspect, a thermal conductive material for transferring heat between the plurality of battery cells and the extruded aluminum tray.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
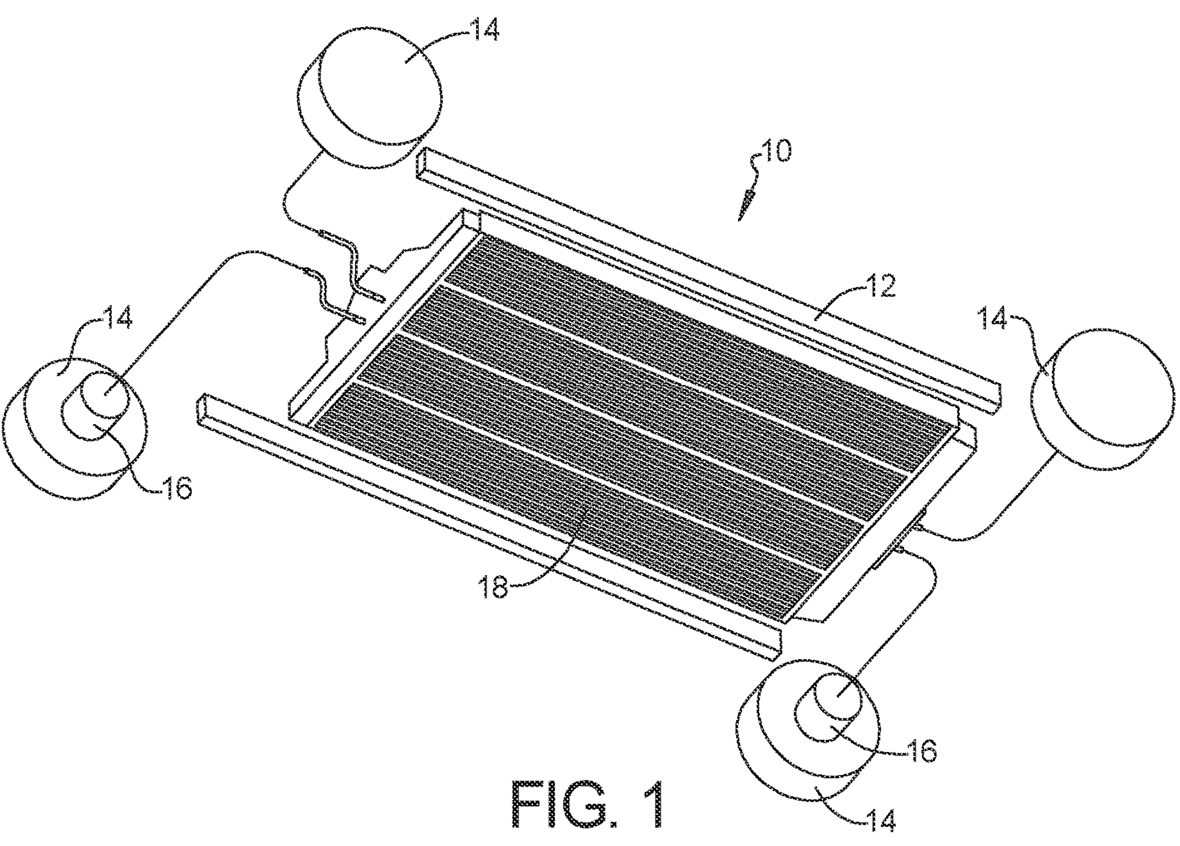
FIG. 1 is a bottom perspective view of a vehicle battery housing.

With reference to FIG. 1, an electric vehicle 10 includes a vehicle chassis 12 supported by four wheels 14. The electric vehicle 10 can include one or more electric motor(s) 16 for driving the four wheels 14. The electric motors 16 can include four electric motors each associated with a respective wheel 14, as shown. Alternative electric motor 16 arrangements of fewer motors can be used. A rechargeable energy storage system 18 is supported by the vehicle chassis 12 and provides electricity to the electric motors 16.

Figure 2:
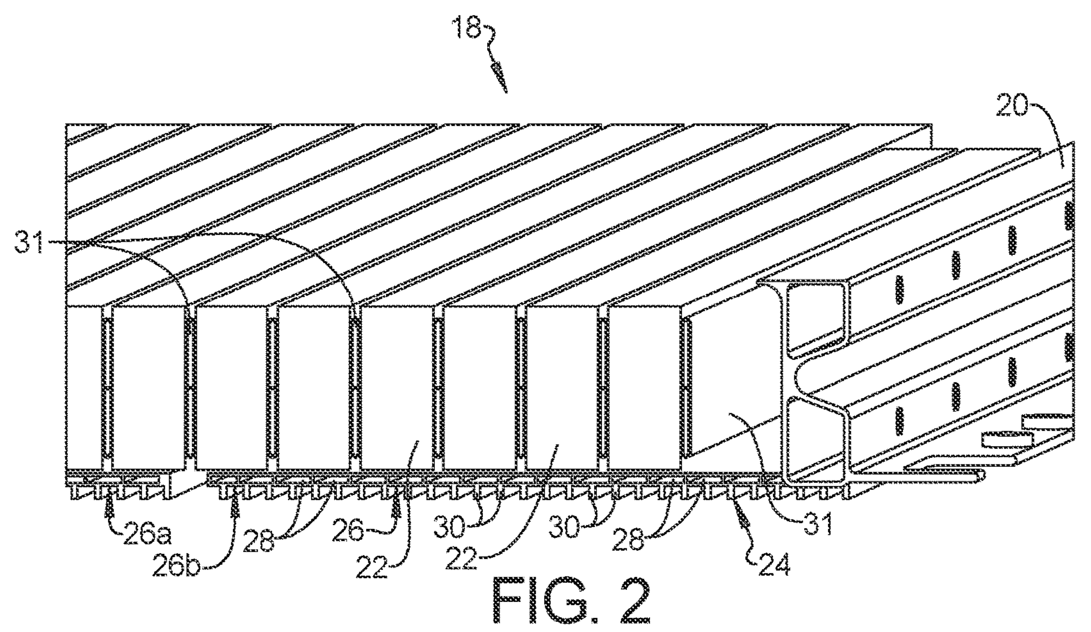
FIG. 2 is a partial cross-sectional view of the battery housing.
Figure 3:
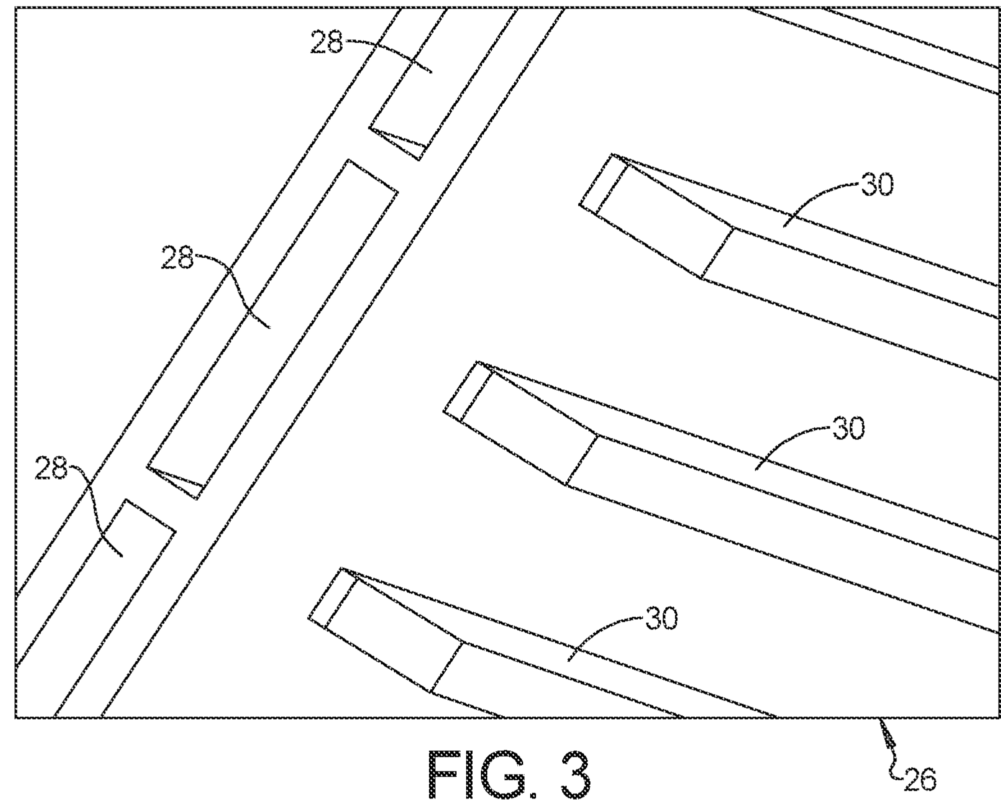
FIG. 3 is a detailed cross-sectional view of the battery tray having coolant passages therein and cooling fins according to the principles of the present disclosure.
Figure 4:
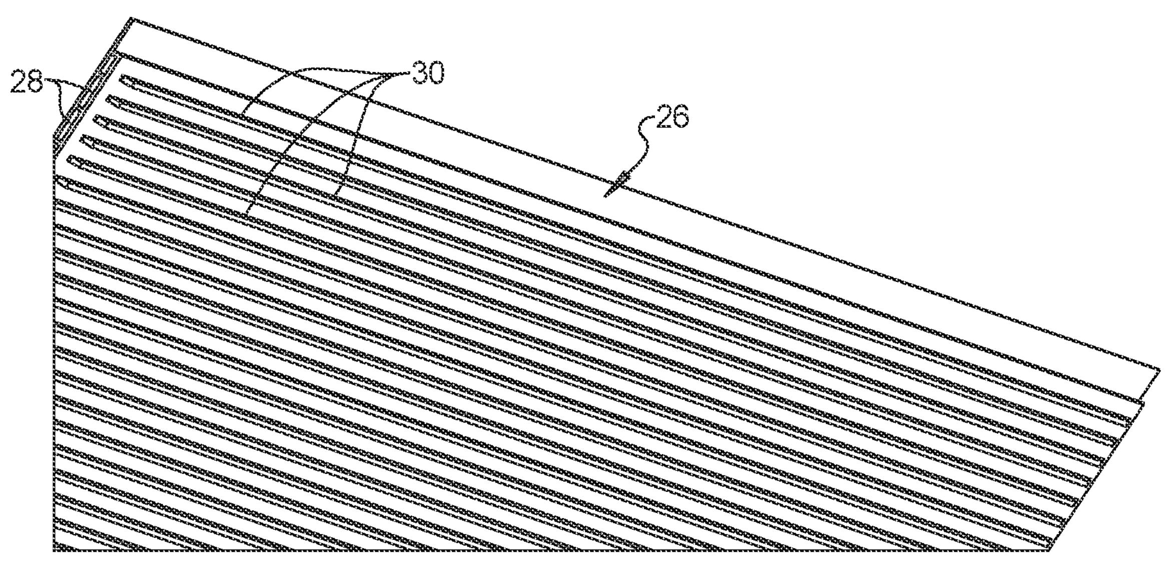
FIG. 4 is a partial bottom perspective view of the battery housing tray.

With reference to FIGS. 2-4, the rechargeable energy storage system 18 includes a housing 20 and a plurality of battery cells 22 disposed within the housing 20. The battery cells can be any known type. A base 24 of the housing 20 includes an extruded aluminum tray assembly 26 having liquid coolant passages 28 extending through the aluminum tray assembly 26 and air cooling fins 30 extending from a bottom of the extruded aluminum tray assembly 26. Additional battery cell coolant passages 31 are disposed between the plurality of battery cells and are connected to the liquid coolant passages 28 extending through the aluminum tray assembly 26. The extruded aluminum tray assembly 26 includes a plurality of tray sections **26*a*, 26*b*** secured together by welding.

Figure 5:
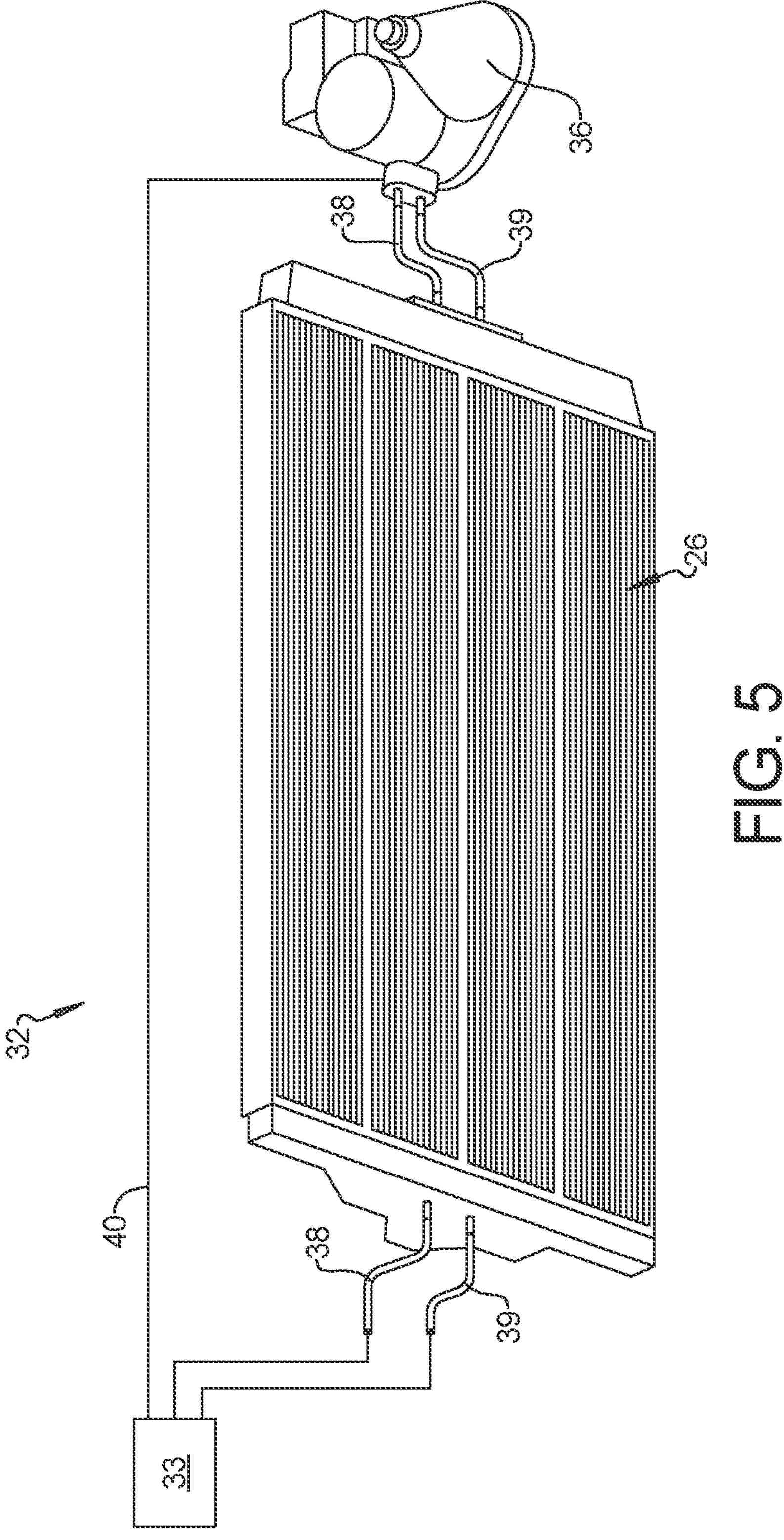
FIG. 5 is a schematic view of a cooling system connected to the coolant passages in the battery housing tray of the vehicle battery housing.

With reference to FIG. 5, a liquid coolant system 32 include a heat exchanger 33 is connected to the liquid coolant passages 28 in the aluminum tray assembly 26 and is connected to coolant passages in an electric component (e.g., an electric motor 16 FIG. 1 or power module FIG. 5) 36 of the vehicle 10 by connection passages 38. A bypass passage 40 can be used to bypass the coolant passages 28 of the aluminum tray 26. The aluminum tray assembly 26 can act as a radiator for cooling hot coolant from the electric component 36.

The air cooling fins 30 can extend in a longitudinal direction of the vehicle chassis 12 in order to reduce wind resistance and yet provide a heat sink for cooling the battery cells 22 and cooling the coolant in the liquid coolant passages 28. The air cooling fins 30 are exposed along a bottom of the vehicle 10 and the aluminum tray assembly 26 serves an additional function of a skid plate.

Figure 6:
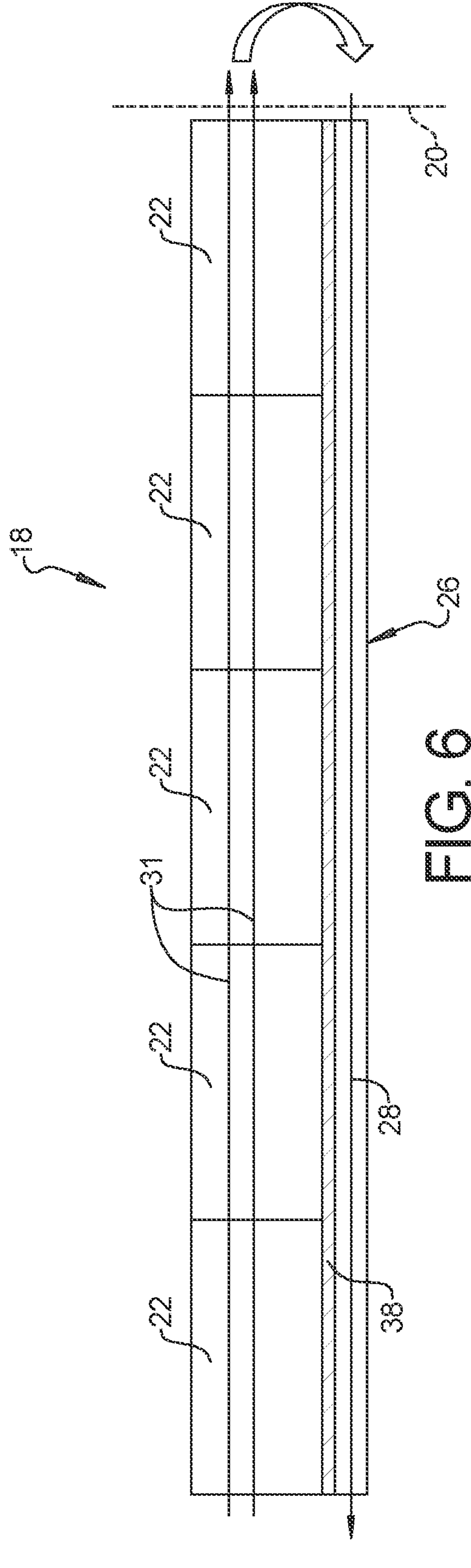
FIG. 6 is a schematic illustration of the cooling system of the battery housing.

With reference to FIG. 6, a liquid coolant flow path through the battery cells 22 is routed through the liquid coolant passages 28 extending through the aluminum tray assembly 26. A thermal isolation material 38 can be provided between the battery cells 22 and the aluminum tray assembly 26 to prevent heat from being transferred from the tray assembly 26 to the battery cells 22. The air cooling fins 30 aid in removing heat from the aluminum tray assembly 26.

The tray assembly 26 can be made from other heat conducting materials such as steel. The air cooling fins 30 can extend a full length of the tray panels or can extend a partial length along the tray panels. The cooling fins can have a height of up to 2 cm and a spacing therebetween of less than 2 cm and a width of up to 1 cm. Alternative spacings, heights and thicknesses can be used.

The liquid coolant passages 28 can be between 1 to 3 cm wide and between 3 to 10 mm in height. Alternative widths and heights can be used.

The thermal isolation material 38 can include ceramic fiber insulation, cellulose, polystyrene, polyurethane foam, wool, fiberglass, or another known insulation material.

A manifold structure can connect to each end of the liquid coolant passages 28 to allow dispersion of the coolant to the passages 28 and collection and delivery of the coolant from the passages 28 for connection to a pump and to the electric components (motors, power module, etc.) being cooled. Gaskets and seals can be used to connect the manifolds to the coolant passages 28. The electric components being cooled can further include electronic controllers and other vehicle components that need cooling.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle, comprising:

a vehicle chassis supported by four wheels;

at least one electric motor for driving at least one of the four wheels;

a rechargeable energy storage system supported by the vehicle chassis and providing electricity to the electric motor, the rechargeable energy storage system including a housing and a plurality of battery cells disposed within the housing, a base of the housing including an extruded aluminum tray assembly having liquid coolant passages extending through the aluminum tray assembly and air cooling fins extending from a bottom of the extruded aluminum tray assembly and isolated from the liquid coolant passages.

2. The vehicle according to claim 1, further comprising a liquid coolant system connected to the liquid coolant passages in the aluminum tray assembly.

3. The vehicle according to claim 2, wherein the liquid coolant system is connected to an electric motor coolant passage of the at least one electric motor.

4. The vehicle according to claim 3, further comprising a coolant connection between the electric motor coolant passage and the liquid coolant passages of the aluminum tray assembly.

5. The vehicle according to claim 1, wherein the air cooling fins extend in a longitudinal direction of the vehicle chassis.

6. The vehicle according to claim 1, wherein the air cooling fins are exposed along a bottom of the vehicle.

7. The vehicle according to claim 1, wherein the liquid coolant system includes battery cell coolant passages disposed between the plurality of battery cells.

8. The vehicle according to claim 1, wherein the extended aluminum tray assembly includes a plurality of tray sections secured together by welding.

9. The vehicle according to claim 1, further comprising a thermal isolation material between the plurality of battery cells and the extruded aluminum tray.

10. The vehicle according to claim 9, wherein the air cooling fins are exposed along a bottom of the vehicle.

11. A vehicle, comprising:

a vehicle chassis supported by four wheels;

at least one electric motor for driving at least one of the four wheels;

a rechargeable energy storage system supported by the vehicle chassis and providing electricity to the electric motor, the rechargeable energy storage system including a housing and a plurality of battery cells disposed within the housing, a base of the housing including an extruded aluminum tray assembly having air cooling fins extending from a bottom of the extruded aluminum tray assembly; and a liquid coolant system connected to a plurality of liquid coolant passages in the aluminum tray assembly, wherein the liquid coolant system is connected to an electric motor coolant passage of the at least one electric motor.

12. The vehicle according to claim 11, further comprising a coolant connection between the electric motor coolant passage and the liquid coolant passages of the aluminum tray assembly.

13. The vehicle according to claim 11, wherein the air cooling fins extend in a longitudinal direction of the vehicle chassis.

14. The vehicle according to claim 11, wherein the air cooling fins are exposed along a bottom of the vehicle.

15. The vehicle according to claim 11, wherein the liquid coolant system includes battery cell coolant passages disposed between the plurality of battery cells.

16. The vehicle according to claim 11, wherein the extruded aluminum tray assembly includes a plurality of tray sections secured together by welding.

17. The vehicle according to claim 11, further comprising a thermal isolation material between the plurality of battery cells and the extruded aluminum tray.

18. The vehicle according to claim 17, wherein the air cooling fins are exposed along a bottom of the vehicle.

* * * * *